United States Patent
Ooishi et al.

(10) Patent No.: US 6,889,529 B2
(45) Date of Patent: May 10, 2005

(54) METHOD OF MANUFACTURING OPTICAL FIBER PREFORM

(75) Inventors: Toshihiro Ooishi, Yokohama (JP); Yuichi Ohga, Yokohama (JP); Yoshio Yokoyama, Yokohama (JP); Motonori Nakamura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 194 days.

(21) Appl. No.: 09/983,624

(22) Filed: Oct. 25, 2001

(65) Prior Publication Data

US 2002/0073737 A1 Jun. 20, 2002

(30) Foreign Application Priority Data

Oct. 30, 2000 (JP) ........................................ 2000-330795
Jan. 24, 2001 (JP) ........................................ 2001-015422

(51) Int. Cl.[7] .............................. C03B 37/07; B05D 1/10
(52) U.S. Cl. .............................. 65/421; 65/382; 65/414; 65/422; 427/193
(58) Field of Search ................... 65/377, 382, 413–416, 65/436, 491, 421–423, 426–427, 900; 385/123–128; 427/163.2, 165–168, 180, 184, 193, 196, 199

(56) References Cited

U.S. PATENT DOCUMENTS

| | | | | |
|---|---|---|---|---|
| 4,227,771 A | * | 10/1980 | Nolan | 385/126 |
| 4,568,370 A | * | 2/1986 | Powers | 65/415 |
| 5,116,400 A | | 5/1992 | Abbott et al. | 65/144 |
| 5,364,430 A | * | 11/1994 | Sarkar | 65/416 |
| 5,674,305 A | * | 10/1997 | Ohga et al. | 65/377 |
| 5,958,102 A | * | 9/1999 | Shimada et al. | 65/382 |
| 6,474,105 B1 | * | 11/2002 | Gouez et al. | 65/377 |

FOREIGN PATENT DOCUMENTS

| | | | | |
|---|---|---|---|---|
| EP | 0 845 441 B1 | | 6/1998 | |
| JP | 01-111747 | * | 4/1989 | ......... C03B/37/018 |
| JP | 1-242434 | | 9/1989 | |
| JP | 2-137743 | | 5/1990 | |
| JP | 02-289439 | * | 11/1990 | ......... C03B/37/018 |
| JP | 3-54129 | | 3/1991 | |
| JP | 3-054129 | | 3/1991 | |
| JP | 3-228845 | | 10/1991 | |
| JP | 4-260633 | | 6/1992 | |
| JP | 4-260633 | | 9/1992 | |
| JP | 4-292434 | | 10/1992 | |
| JP | 6-092670 | | 4/1994 | |
| JP | 9-278477 | | 10/1997 | |
| JP | 10-158025 | | 6/1998 | |
| JP | 11-35335 | | 2/1999 | |

* cited by examiner

Primary Examiner—Eric Hug
(74) Attorney, Agent, or Firm—McDermott Will & Emery LLP

(57) ABSTRACT

A method for producing an optical fiber preform is provided in which the variation of the outer diameter in the longitudinal direction is minimized and a target quantity of glass is accumulated as a whole. Based on a predetermined relationship between three variables: the outer diameter of a starting rod being a first variable, the outer diameter of an optical fiber preform a second variable, and the timing for ending the glass particles depositing process a third variable, the starting rod and burners are subjected to relative reciprocating movement so as to deposit glass particles on the starting rod until the timing for ending the depositing process, and then the resulting deposit body is vitrified. The third variable may be the traverse velocity, the glass particles deposition time, or the weight of a soot glass deposit body.

30 Claims, 4 Drawing Sheets

METHOD OF MANUFACTURING OPTICAL FIBER PREFORM

BACKGROUND OF THE INVENTION

1. Field of the Invention

The present invention relates to a method of manufacturing an optical fiber preform by an OVD method, and more particularly to a method for producing an optical fiber preform in which the variation of outer diameter in the longitudinal direction is minimized without decreasing the deposition speed and a target quantity of glass is achieved as a whole.

2. Description of the Background Arts

Japanese Patent Application Laid-Open No. 3-228845 discloses a method for manufacturing a large-sized optical fiber preform at high speed by an OVD method. In the disclosed method, a plurality of burners for synthesizing glass particles are arranged in a row at constant intervals, and the row of burners and a starting rod, which are opposed to each other, are reciprocated relatively so as to produce a soot glass deposit body by depositing glass particles around the starting rod which is rotating, and then the soot glass deposit body is vitrified to become a transparent optical fiber preform.

In the method, an attempt is made in the method of reciprocating movement so as to reduce the outer diameter variation of a soot glass deposit body in the longitudinal direction. Every time the starting rod and the row of burners reciprocate relatively, the turning position of the reciprocation is shifted, and when it reaches a predetermined point, the turning position of the reciprocation is shifted in the opposite direction to return to the beginning position. Thus, the turning positions of the reciprocation where the deposition time is long are distributed longitudinally such that the deposited quantity of glass particles become equal in the longitudinal direction, thereby reducing the longitudinal variation of the outer diameter of the soot glass deposit body. In this specification, the number of times of the reciprocation that the turning position of the reciprocation returns to the beginning position is called "the number of equalization-round turns".

In this method, it is important to determine a schedule for depositing glass particles so that the turning positions may be distributed uniformly over the whole length of the soot glass deposit body. Such schedule for depositing glass particles is established such that the deposited quantity of glass particles is continuously measured with a weight detecting device or the like, and when the measured value becomes close to a target weight, the depositing process may end at the integral multiple of the number of equalization-round turns and the target weight may be attained. Japanese Patent Application Laid-Open No. 3-228845 does not disclose any method for determining such target weight.

Japanese Patent Application Laid-Open No. 10-158025 discloses a method for reducing the outer diameter variation of a soot glass deposit body. In the disclosed method, the outer diameter variation of the whole soot glass deposit body is measured using a central information processing equipment and a CCD camera that can monitor the whole soot glass deposit body such that supplementary deposition of glass particles is made by an auxiliary glass synthesizing burner in the parts where the outer diameter is smaller than that of the other parts. The auxiliary glass synthesizing burner can move the full length of the deposit body independently, thereby reducing the variation in the outer diameter along the whole length.

Also, Japanese Patent Application Laid-Open No. 4-260633 discloses equipment for producing a soot glass deposit body in which the last traverse velocity of burners is determined so as to produce a soot glass deposit body having a target volume by estimating the relevant weight increase based on the data obtained by measuring the weight increase due to each traverse during the depositing process. Japanese Patent Application Laid-Open No. 3-54129 also discloses a method for producing an optical fiber preform in which the traverse velocity or the supply quantity of glass materials in the last traverse is determined in a similar manner. Neither Japanese Patent Application Laid-Open No. 4-260633 nor Japanese Patent Application Laid-Open No. 3-54129 discloses any method for determining a target weight in which glass particles at the tapered portions of the deposit body are taken into consideration.

Japanese Patent Application Laid-Open No. 2-137743 discloses a method for producing an optical fiber preform in which the deposition of soot glass is stopped if the weight per unit length of the soot glass deposit body reaches a predetermined value while measuring the outer diameter and the weight of the deposit body during the depositing process and computing the weight per unit length of the deposit body on the assumption that the length of the deposit body is the summation of the distance of burner movement and the length of the tapered portions of the deposit body. The laid-open patent application does not disclose any method for determining a target weight in which glass particles accumulating at the tapered portions of the deposit body are taken into consideration. Furthermore, no consideration is given to the shape of the tapered portions or the differences in the bulk densities between the effective portion and the tapered portions of the deposit body.

SUMMARY OF THE INVENTION

The purpose of the present invention is to provide a method for producing an optical fiber preform in which the variation of the outer diameter in the longitudinal direction is minimized and a target quantity of glass is accumulated as a whole. In a method according to the present invention, based on a predetermined relationship between three variables: the outer diameter of a starting rod being a first variable, the outer diameter of an optical fiber preform a second variable, and the timing for ending the glass particles depositing process a third variable, the starting rod and burners are subjected to relative reciprocating movement to deposit glass particles on the starting rod until the timing of ending the depositing process, and then a resulting deposit body is vitrified.

In one aspect according to the present invention, a starting rod may be drawn to have an outer diameter determined by a desired outer diameter of an optical fiber preform and a jacketing ratio, or the outer diameter of an optical fiber preform may be determined by the outer diameter of the starting rod and the jacketing ratio. The term "jacketing ratio" as used herein means "the ratio of the cladding outer diameter to the outer diameter of a starting rod in an optical fiber preform".

In another method according to the present invention, the velocity of the reciprocating movement with which a target jacketing ratio can be achieved by a predetermined number of times of reciprocation is determined, and a starting rod and burners are subjected to relative reciprocating movement at the determined velocity according to the predetermined number of times so as to deposit glass particles on the starting rod.

In another method according to the present invention, a starting rod may be drawn to have an outer diameter which is determined by a desired outer diameter of an optical fiber preform and jacketing ratio thereof, and the speed of the reciprocating movement with which the target jacketing ratio can be achieved by a predetermined number of times of reciprocation is determined, and the starting rod and burners are subjected to relative reciprocating movement according to the predetermined number of times at the determined speed so as to deposit glass particles on the starting rod.

In one aspect of the present invention, the turning position of the reciprocation movement may be shifted at constant intervals from the beginning position in a constant direction to a predetermined point, and then the turning position of the reciprocation may be shifted at constant intervals in the opposite direction to return to the beginning position. The recoprocating movement velocity may be constant from the beginning to the end of a glass particles deposition process, or it may be changed during the depositing process to a speed that can achieve a desired jacketing ratio. The flow rate of a combustible gas supplied to a burner may be adjusted at the time of changing the traverse velocity so that the temporal variation in the surface temperature of the soot glass deposit body may become substantially constant in spite of the changes in the traverse velocity.

The above and further objects and novel features of the invention will be more fully clarified from the following detailed description when the same is read in connection with the accompanying drawing. It is to be expressly understood, however, that the drawings are for the purpose of illustration only and are not intended as a definition of the limits of the invention.

BRIEF DESCRIPTION OF THE DRAWINGS

In order to more fully understand the drawings used in the detailed description of the present invention, a brief description of each drawing is provided.

DETAILED DESCRIPTION OF THE INVENTION

Figure 1:
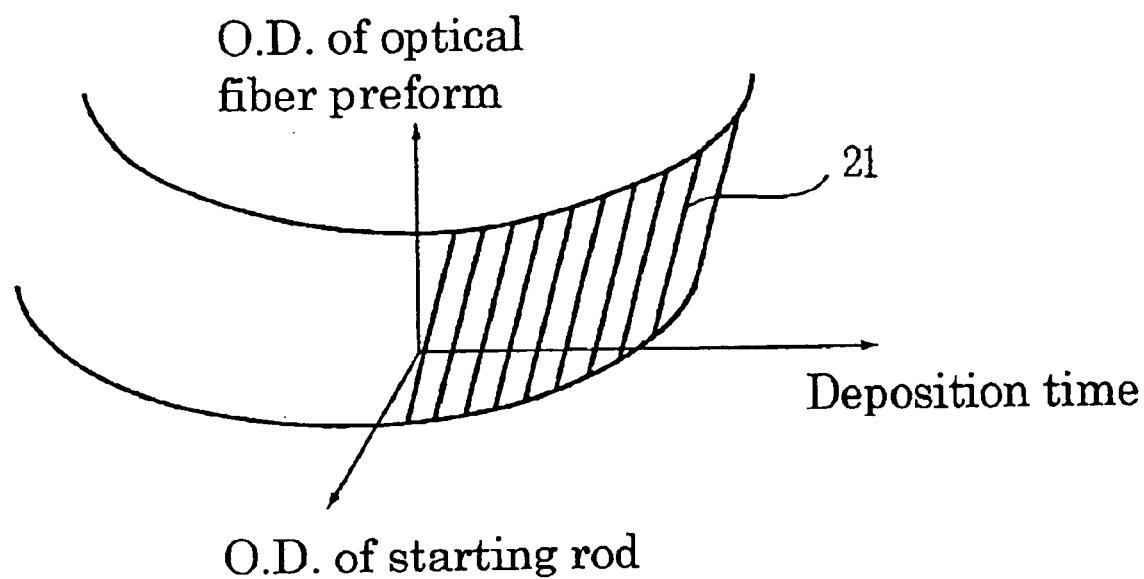
FIG. 1 is a graph showing the relationship between the outer diameter of a starting rod, the deposition time, and the outer diameter of an optical fiber preform, in one embodiment of the present invention.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted. The dimensions in the drawings are partly exaggerated and do not always correspond to actual ratios of dimensions.

In the present invention, the relationship between the outer diameter of a starting rod, the outer diameter of an optical fiber preform, and the timing to end the deposition of glass particles is obtained beforehand by experiment. Then, when manufacturing an optical fiber preform, the timing to end the deposition is determined according to the relationship thus obtained, the outer diameter of the optical fiber preform, and the outer diameter of the starting rod.

More specifically, by changing the outer diameter of a starting rod and the timing to end deposition, seek the resulting outer diameter of an optical fiber preform. Then, the data such as shown in a curved surface 21 of FIG. 1 is obtained, for example. Then, seek a function that is suitable for expressing the data, and find a concrete function form by the least squares method. It may be approximated to an exponential relationship such as the following formula with three variables:

$$S = k_1 \times R \times \mathrm{Exp}(k_2 \times C) \qquad \text{(Formula 1)}$$

where R represents the diameter of a starting rod, S represents the outer diameter of an optical fiber preform, and C represents the timing to end deposition.

When the deposition of glass particles is performed using the method disclosed in Japanese Patent Application Laid-Open No. 3-228845, the number of times of the reciprocating movement of the starting rod and the burners may be determined beforehand as a number of integral multiples of the number of equalization-round turns, and the traverse velocity can be used as the manufacturing parameter to give the timing to end the deposition. Since the traverse velocity can be changed mechanically, accurately, and continuously, it is possible to adjust the quantity of deposited glass particles accurately and continuously.

The outer diameter of an optical fiber preform may be determined by multiplying the outer diameter of a starting rod as a constant value by a targeted jacketing ratio. In such case, since starting rods can be typically prepared, it is possible to manufacture starting rods having a precise outer diameter, which results in improved yield. On the other hand, in the case where there is a preferable value for the outer diameter of an optical fiber preform to be determined depending on the convenience of a subsequent process, the outer diameter of a starting rod may be determined based on such preferable value and a targeted jacketing ratio.

The comparisons between the present invention and other methods are described in the following.

(1) A method in which the deposition of glass particles is ended at a predetermined number of turns In this method, the quantity of deposition cannot be continuously controlled because the number of turns is a discretely dispersing quantity. In particular, when this method is applied to the method of depositing glass particles disclosed in Japanese Patent Application Laid-Open No. 3-228845, the deposition of glass particles is stopped at the integral multiple of the number of equalization-round turns to produce a jacketing ratio that is closest to a target value, and it is impossible to control the quantity of deposition minutely. On the other hand, according to the present invention, it is possible to control the quantity of deposition precisely because the timing of ending the deposition is determined using a predetermined relationship between the outer diameter of a starting rod, the outer diameter of an optical fiber preform, and the timing to end the deposition, the quantity of which is shown continuously.

(2) Methods disclosed in Japanese Patent Application Laid-Open Nos. 3-228845, 4-260633, and 3-54129

In these methods, it is impossible to precisely estimate the weight of the tapered portions of a soot glass deposit body at both ends of a starting rod, which portions are not suitable for a product. None of these patent applications discloses a method to solve this problem. Therefore, in these methods, because of an error due to the weight of the taper portions, the jacketing ratio or the outer diameter of a deposit body occasionally becomes remote from the targeted value. On the other hand, in the present invention, the influence of the tapered portions is offset and the outer diameter of the deposit body or jacketing ratio can be made approximately to the targeted value because the timing for ending a depositing process can be determined using a predetermined relationship between the outer diameter of a starting rod, the outer diameter of an optical fiber preform, and the timing for ending a deposition. Incidentally, in the methods disclosed in Japanese Patent Application Laid-Open Nos. 4-260633 and 3-54129, only the velocity of the last traverse is adjusted. Therefore, the last traverse velocity requires a very broad change.

(3) Method disclosed in Japanese Patent Application Laid-Open No. 10-158025

In the disclosed method, since a supplementary deposition of glass is made by only one auxiliary glass synthesis burner, there is decreased efficiency of glass particles deposition. Also, an operational mechanism for the auxiliary glass synthesis burner must be provided. If the operational mechanism is installed outside a chamber, a large hole must be provided in the wall of the chamber and hence voids may be generated in an optical fiber preform by impurities mixing thereinto from outside the chamber. If the operational mechanism is installed in the chamber, impurities generated by the operational mechanism may mix into a soot glass deposit body, generating voids in an optical fiber preform. In contrast, according to the present invention, an optical fiber preform can be manufactured without decreasing the deposition speed, and without impurities mixing into the optical fiber preform.

Next, a first embodiment of the present invention will be described. Here, a desired quantity of glass particles is deposited by controlling the movement velocity. For example, the number of turns till the end of glass particles deposition is set to 10 turns, and the distance of each turns is set to 100 mm: that is, the total movement length is 1000 mm. Each deposition of glass particles is performed at movement velocitie of 200, 500, or 1000 mm/min. That is, the duration of each deposition of glass particles is 5, 2, or 1 min. Such variation in glass particles deposition time is expressed as a variation in the thickness of a deposit layer of glass particles accumulated by each traverse. In the case of 1000 mm/min, the thickness of the glass particles deposit is about half compared with the case of 500 mm/min. However, the quantity of deposition per unit time does not decrease because the glass particles deposition time also becomes half.

Figure 2:
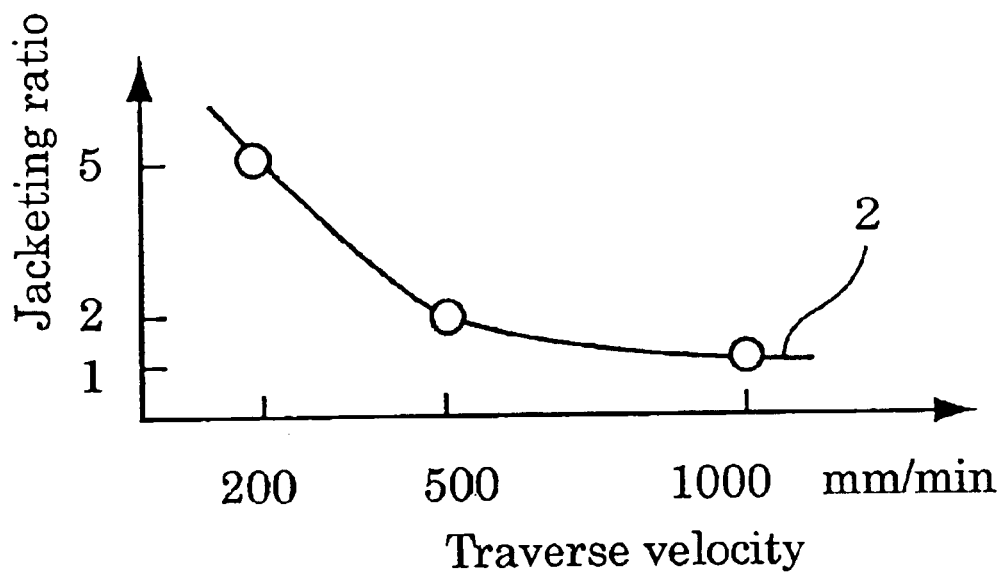
FIG. 2 is a graph showing the relationship between the traverse velocity and the jacketing ratio in the present invention.

Next, the obtained preforms are consolidated and the jacketing ratio thereof is measured. The relationship between the velocity and jacketing ratio is plotted as curve 2 shown in FIG. 2. The relationship between the velocity and jacketing ratio can be expressed as a relational formula by approximating the curve 2 with a suitable function such as a linear or quadratic function. Then, the traverse velocity suitable for a desired jacketing ratio can be calculated from the formula.

In this embodiment, the size of a starting rod and the number of times of the relative reciprocating movement of burners are determined beforehand, taking various factors into consideration: not only factors relating to jacketing process such as the kinds of the burners, the intervals of the burners, the quantity of raw materials, but also limitations other than the jacketing process. Thus, the quantity of deposited glass particles can be adjusted by changing the traverse velocity and thereby freely changing the glass particles deposition time in which the number of the turns has been determined.

In this embodiment, the influence of the tapered portions is already taken into consideration because the relationship between the traverse velocity and jacketing ratio is experimentally determined. Also, the traverse velocity is mechanically controlled and is very precise. Accordingly, the quantity of glass particles accumulated by a given times of traverse can be controlled precisely by adjusting the traverse velocity.

The method of determining the timing to end glass particles deposition by measuring the outer diameter of the soot glass deposit body has the drawbacks that the equipment cost becomes high because an instrument for measuring the outer diameter deposit body is necessary and that the outer diameter measuring instrument cannot perform precise measurement if the deposit body moves around shakingly.

In the first embodiment, the outer diameter of optical fiber preforms is controlled by changing the traverse velocity, and using starting rods having the same diameter. However, occasionally where it is necessary to change the outer diameter of a starting rod so as to adjust the jacketing ratio by adjusting the outer diameter of an optical fiber preform to meet the size of the facilities for a process subsequent to the deposition of glass particles.

A second embodiment of the present invention is a method suitable for such case. The outer diameter of an optical fiber preform is made to a desired size by setting the traverse velocity according to the outer diameter of a starting rod and depositing glass particles thereon. In this case, the traverse velocity is also used to control the timing to end the deposition of glass particles. More specifically, the glass particles deposition time is changed by altering the traverse velocity according to the total traverse distance of the glass rod and the burners calculated by the number of turns occurring until the end of the deposition of glass particles. In the following, the effect of changing the outer diameter of a starting rod is described.

Figure 3:
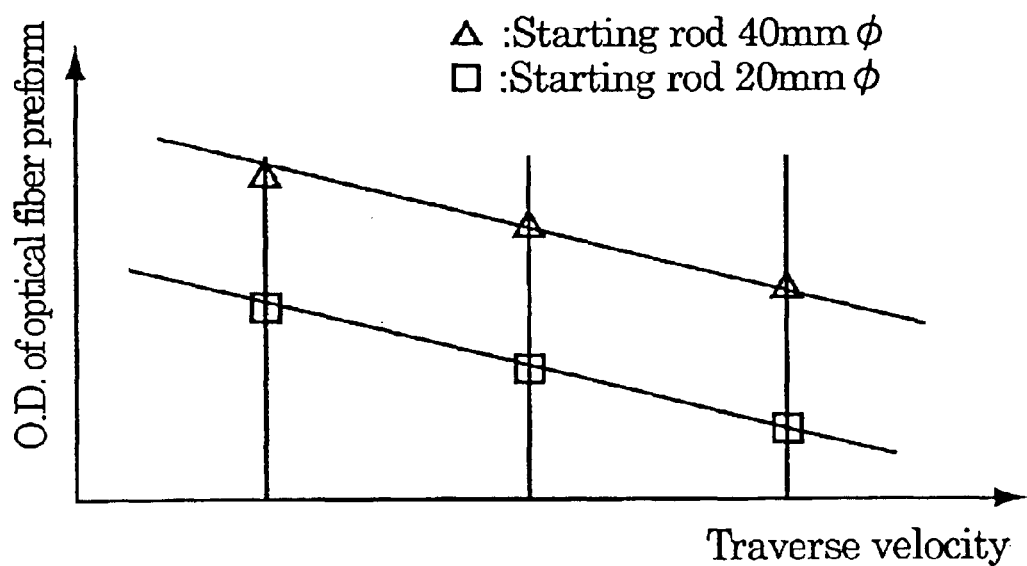
FIG. 3 is a graph showing the relationship between the traverse velocity and the outer diameter of an optical fiber preform when the round trip number of the traverse of burners is a constant value.

FIG. 3 shows the relationship between the traverse velocity and the outer diameter of an optical fiber preform in the case where the outer diameters of starting rods are 40 mm and 20 mm and the number of turns occurring until the end of deposition of the glass particles is the same. The straight lines of FIG. 3 show the relationship between the traverse velocity and the outer diameter of optical fiber preforms, using the outer diameter of a starting rod as a parameter. The relationship between these three amounts is shown in three dimensions as a plane 51 of FIG. 4.

The plane 51 can be expressed approximately by the following formula:

$$T = a \times R + b \times S + c \qquad \text{(Formula 2)}$$

where a, b, and c are coefficients, S is the outer diameter of an optical fiber preform, T is the traverse velocity, and R is the outer diameter of a starting rod.

The coefficients a, b, and c in the formula 2 can be determined based on the data obtained by several experiments. Then, the traverse velocity can be obtained by substituting the desired outer diameter of an optical fiber preform and the outer diameter of a starting rod computed from the target jacketing ratio into the formula 2. By considering the plane 51 of FIG. 4, it is possible to determine the traverse velocity needed for producing an optical fiber preform having a constant outer diameter by consolidating a soot glass deposit body when the outer diameter of a starting rod is changed. That is, it is possible to adjust the glass particles deposition time solely by means of the traverse velocity as in the first embodiment.

Figure 4:
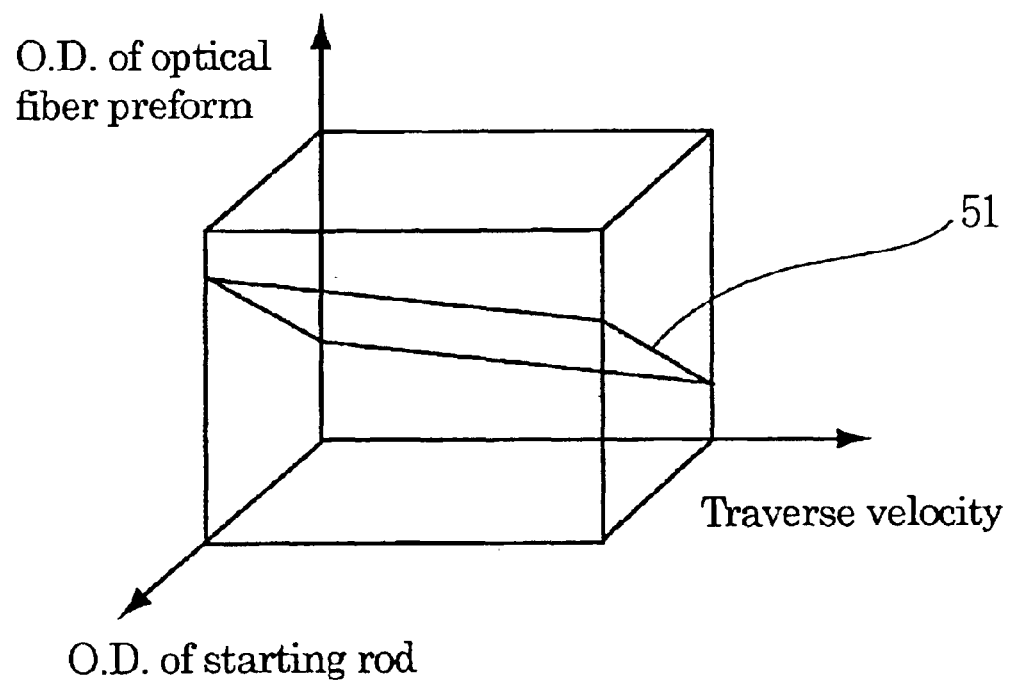
FIG. 4 is a graph showing the relationship between the traverse velocity, the outer diameter of a starting rod, and the outer diameter of an optical fiber preform.

The above-mentioned parameters (the outer diameter of a starting rod, the outer diameter of an optical fiber preform, and the traverse velocity) can be controlled precisely because they can be accurately measured. Also, after production is commenced using such formula once obtained, new data such as the outer diameter of the produced articles can be used to improve the precision of the formula 2. FIG. 4 shows the plane 51 in three-dimensional space. If there is a case where a plane is inapplicable, a function suitable for such case may be chosen accordingly.

In the present invention, the least squares method can be used for deducing the coefficients. However, it is not a limitation. Also, while the traverse velocity is used as a variable to represent the timing to end the glass particles deposition process in the above explanation, it is not a limitation. The glass particles deposition time, the weight of a soot glass deposit body, or the like may be used instead.

Figure 5:
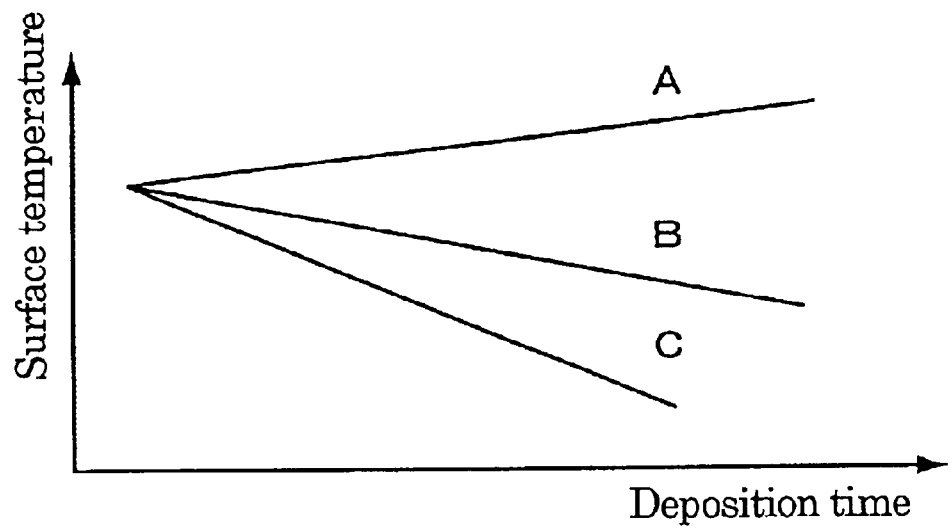
FIG. 5 is a graph showing the relationship between the deposition time of glass particles and the surface temperature of the soot glass deposit body.

A third embodiment of the present invention is a method to adjust variations in the surface temperature of soot glass deposit bodies during the deposition of glass particles. FIG. 5 is a graph showing variations in the surface temperature during the deposition processes (A, B, C) employing three traverse velocities. The surface temperature is generally in the range of 500–850° C.

As shown in FIG. 5, not only does the surface temperature change during the deposition of glass particles in the respective deposition processes (A, B, and C), but also the manner of the temperature change differs depending on the traverse velocities in the deposition processes. The bulk density of a deposit body changes when the surface temperature changes. The variation of bulk density becomes the variation of refractive index when a dopant is added at the time of consolidating a deposit body. The surface temperature preferably should not change and the refractive index of each optical fiber preform should be identical even if the traverse velocity is different. Therefore, adjustment is made with combustible gas such as $H_2$ or $CH_4$ supplied to the burners so that each deposit body may have the same temporal variation in the surface temperature.

A method such as disclosed in Japanese Patent Application Laid-Open No. 3-228845 has a drawback that it is difficult to set the number of turns to an integral multiple of the number of equalization-round turns so as to meet the target jacketing ratio. A fourth embodiment of the present invention is made to solve such a problem. An explanation will be given with a case in which the number of equalization-round turns is 40. In the present embodiment, the number of turns which meets the target jacketing ratio is first determined to be 1600 turns, which is 40 times the number of equalization-round turns. Under such condition, the quantity of deposited glass particles is then adjusted with the traverse velocity. For example, assuming three traverse velocities of B mm/min, B+C mm/min, and B−C mm/min (where B>C. 0), the glass particles deposition time as well as the quantity of deposited glass particles differs depending on the respective traverse velocities. The relationship in terms of the quantity of deposition is [the quantity in the case of B+C mm/min]<[the quantity in the case of B mm/min] <[the quantity in the case of B−C mm/min]. Thus, the quantity of deposited glass particles can be adjusted.

In the first to fourth embodiments, rod traverse velocity or burner traverse velocity is selected, and the traverse velocity selected so as to meet the respective target jacketing ratio is maintained from the beginning to the end of glass particles deposition. In the situation that glass particles are not deposited so much on the starting rod at the stage immediately following the beginning of deposition, the efficiency of depositing glass particles is poor because the deposition target is small. In such a case, preferably a desirable traverse velocity is maintained until the diameter of the soot glass deposit body increases to some degree and then the traverse velocity is adjusted to the speed that can produce a target jacketing ratio.

Therefore, in a fifth embodiment of the present invention, a predetermined traverse velocity for depositing glass particles is maintained until a given turn, then after such turn the traverse velocity is shifted to the speed that can achieve a target jacketing ratio. Here, the term "until a given turn" means "until the turn at which the outer diameter of the deposit body has increased to the degree where the efficiency of depositing glass particles does not change even if the traverse velocity is altered." In the case of this embodiment, a given initial traverse velocity is maintained until a given traverse turn, also at the time of obtaining the relationship between the outer diameter of a starting rod, the outer diameter of an optical fiber preform, and the timing to end the deposition of glass particles.

In this method, the inclination of the graph for the traverse velocity vs. jacketing ratio becomes tapers off, and in addition to the above-described effect of stabilizing the deposition of glass particles, there is another effect that the jacketing ratio can be easily and effectively controlled.

EXAMPLE 1

Figure 6:
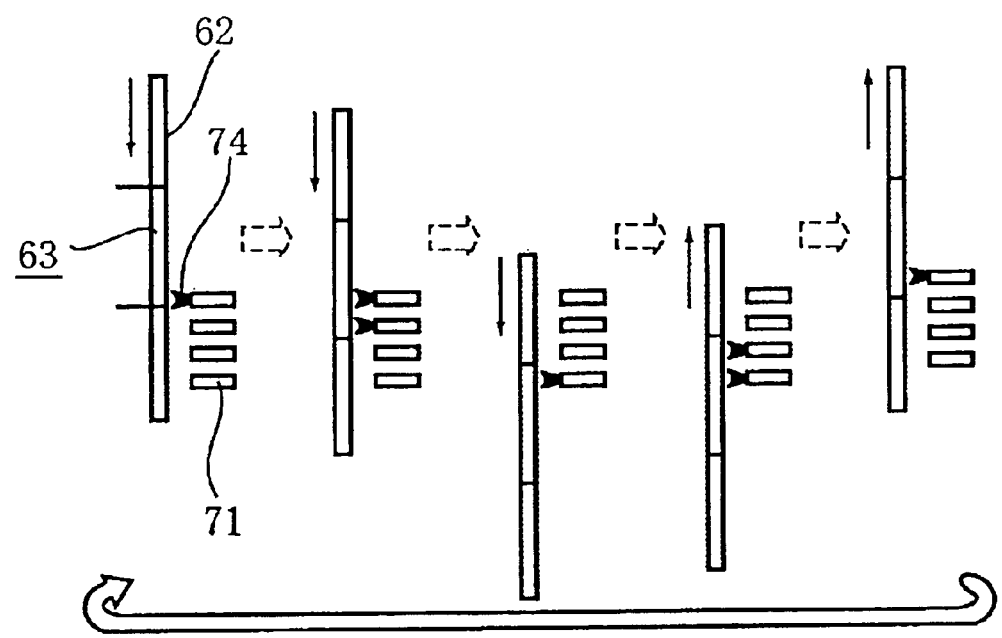
FIG. 6 schematically shows the traverse of a starting rod in the glass particles depositing process of Example 1.

As shown in FIG. 6, four glass synthesis burners 71 arranged at intervals of 200 mm were traversed reciprocally over the length (600 mm) of the effective portion 63 of a starting rod 62 plus the width (1000 mm) of the burner array, and altering the outer diameter of a starting rod and the glass particles deposition time, an experiment was performed to measure the outer diameters of the resultant optical fiber preforms. While each burner is located opposite the effective portion of the starting rod, an equal quantity of $SiCl_4$ 74 was supplied to each burner. In this example, the traverse velocity of the starting rod was 740 mm/min. The results are as shown in Table I.

TABLE I

| Outer diameter of starting rod (mm) | Glass deposition time (minute) | Outer diameter of optical fiber preform (mm) |
|---|---|---|
| 40.04 | 424 | 129.54 |
| 38.3 | 424 | 128.51 |
| 39.5 | 452 | 131.78 |
| 37.71 | 452 | 130.1 |
| 39.88 | 482 | 133.86 |
| 38.05 | 482 | 132.75 |
| 30.24 | 482 | 131.02 |
| 30.08 | 512 | 136.25 |
| 29.97 | 560 | 138.49 |

The relationship between the three variables was approximated with the following formula:

(Time)=$a \times S^2 + b \times S + c \times R$

The coefficients a, b, c were sought by the least squares method, resulting in the following formula:

(Time)=$0.04554 \times S^2 - 1.7403 \times S - 2.632 \times R$

The correlation coefficient between the values obtained from the formula and the experimental values was 0.98, which proved that the formula could approximate the experimental results by a precision of ±1%.

Next, the deposition of glass particles was performed on a starting rod having an outer diameter of 36 mm so that the outer diameter of an optical fiber preform might become 130 mm. The deposition time was 449 min, as computed from the relational expression. The outer diameter of the obtained preform was 131 mm, and the discrepancy between the obtained value and the target value was 0.8%. It is acceptable if such discrepancy is less than ±2%, preferably less than ±1%, and more preferably less than ±0.5%.

EXAMPLE 2

As shown in FIG. 6, four glass synthesis burners 71 arranged at intervals of 200 mm were traversed reciprocally over the length of the effective portion 63 of a starting rod 62 +1000 mm so as to deposit glass particles. The target jacketing ratio was 3.0 times, and the timing to end the deposition of glass particles was determined by four methods using: (1) a predetermined weight, (2) a predetermined number of turns, (3) a predetermined outer diameter of a soot glass deposit body, and (4) a method according to the present invention.

Here, (1) is a conventional method performed in the past: first the volume of a jacketing layer to be deposited is calculated beforehand from the outer diameter of a starting rod, and the jacketing ratio, and then the corresponding weight of glass particles to be deposited is calculated by multiplying the volume and the bulk density such that the deposition of glass particles is stopped when glass particles have been deposited to the weight. In the case of (4), the total number of turns to the end of deposition was 1600 turns, and the traverse velocity was used as the manufacturing parameter to determine the timing to end the deposition of glass particles. The traverse velocity in (1)–(3) was 800 mm/min, and the traverse velocity in (4) was 1153 mm/min.

In the cases of (1) through (4), the variation percentage was 1.5%, 1.3%, 2%, 1%, respectively. Here, the variation percentage is defined by:

|measured jacketing ratio−target jacketing ratio|÷target jacketing ratio

In the case of (1), it is considered that the variation percentage was large because the weighing became unstable because of the movement of the measured deposit body, in addition to the problem involved in estimating the weight of the tapered portions.

As for (3), it is considered that the variation percentage was large because the measurement of the outer diameter became unstable because of the movement of the measured deposit body, in addition to the errors due to differences in the bulk densities of deposited layers.

EXAMPLE 3

As shown in FIG. 6, four glass synthesis burners 71 arranged at intervals of 200 mm were traversed reciprocally over the length of the effective portion 63 of a starting rod 62 +1000 mm such that glass particles were deposited by 1600 turns. The outer diameter of the starting rod and the traverse velocity were modified for the experiments, and the outer diameters of the optical fiber preforms were measured. The results are as shown in Table II.

TABLE II

| Outer diameter of starting rod (mm) | 20 | 20 | 20 | 30 | 30 | 30 |
|---|---|---|---|---|---|---|
| Traverse velocity (mm/min) | 703 | 803 | 903 | 703 | 803 | 903 |
| Outer diameter of optical fiber preform (mm) | 142 | 133 | 120 | 153 | 147 | 133 |

The results of these experiments were approximated with the plane, the coefficients were determined by the least squares method, and the following formula 3 was obtained:

$$T = 11.68 \times R - 9.22 \times S + 1783.82 \quad \text{(Formula 3)}$$

Next, the deposition of glass particles was performed on a starting rod having an outer diameter of 40 mm so that the outer diameter of an optical fiber preform might become 145 mm. The traverse velocity was set to 913.7 mm/min computed from the formula 3. The outer diameter of the obtained preform was 146.5 mm, and the discrepancy between the obtained value and the target value was about 1%.

EXAMPLE 4

Figure 7:
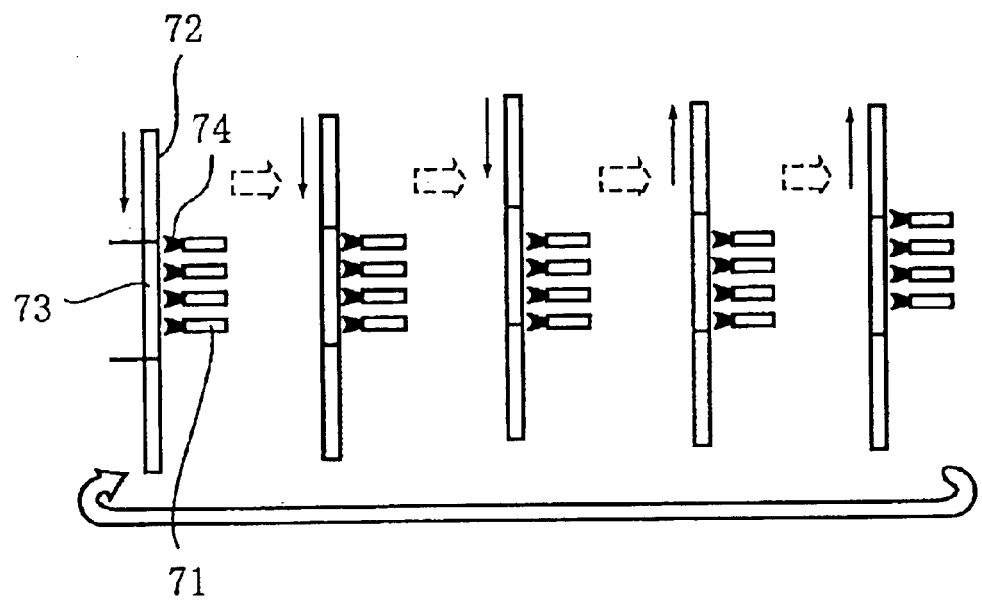
FIG. 7 schematically shows the traverse of a starting rod in the glass particles deposition process of Example 4.

As shown in FIG. 7, four glass synthesis burners 71 arranged at intervals of 200 mm were traversed reciprocally over a length approximately equivalent to an interval of the arrangement of the burners such that glass particles were deposited on a starting rod 72 having a diameter of 38 mm.

The turning position of traverse was shifted by 10 mm at each round-trip such that the dispersion of such turning position was completed along the whole length of the soot glass deposit body by 40 round-trips. The timing to end the deposition of glass particles was determined by the four methods (1) through (4) described in Example 2, and in the case of (4), the number of turns to be performed to the end was set to 1600 turns, and the traverse velocity was 740 mm/min.

As a result, the variation percentage and the outer diameter variation in each case were as shown in Table III.

TABLE III

| Method of determining timing to end deposition | (1) | (2) | (3) | (4) |
|---|---|---|---|---|
| Variation percentage (%) | 2.5 | 2.1 | 3.0 | 1.3 |

The variation percentage in the cases of (1) through (3) degraded compared to the cases of (2). This means that the outer diameter variation of the deposit body degraded and hence the variation percentage also worsened because the traverse was stopped when the outer diameter of the deposit body became the value to meet the target jacketing ratio, and consequently the turning position of the traverse was not dispersed completely over the whole length of the deposit body. On the other hand, the variation percentage of (4) was 1.3%. This is because the jacketing ratio can be adjusted without changing the number of turns at which the deposition is stopped, and consequently the outer diameter variation is substantially suppressed. In this traverse method, however, since the deposition of glass particles is performed in a manner in which the four burners share the deposition at the effective portion, the outer diameter variation is somewhat larger and accordingly the variation percentage is also slightly degraded as compared with the data of Example 1 where the jacketing ratio is adjusted by the traverse velocity.

EXAMPLE 5

As shown in FIG. 6, four glass synthesis burners 71 arranged at intervals of 200 mm were traversed reciprocally over the length of the effective portion 63 of a starting rod 62 +1000 mm such that glass particles were deposited. In the state where the number of turns to be performed until the end of the deposition of glass particles was fixed to 1600 turns, three traverse velocities were adopted: 703, 803, and 983 mm/min, and the jacketing ratio and the bulk density of the soot glass deposit bodies were measured.

Figure 8:
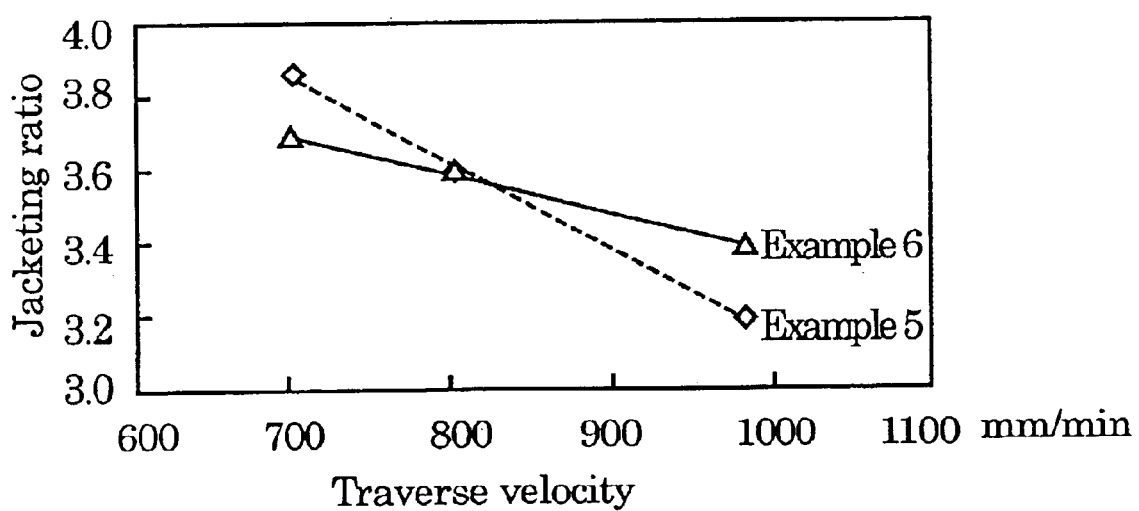
FIG. 8 is a graph showing the relationship between the traverse velocity and jacketing ratio in Examples 5 and 6.

As shown by the broken line in FIG. 8, the relationship between the jacketing ratio and the traverse velocity was an approximately linear relationship. Also, the bulk densities of the soot glass deposit bodies were in the range of 0.5 to 0.7 g/cm$^3$.

EXAMPLE 6

The deposition of glass particles was performed under the same conditions as described in Example 5 except that the traverse velocity was fixed to 803 mm/min until 1200 turns, and thereafter changed to 703, 803, and 983 mm/min. The relationship between the traverse velocities after 1200 turn and the jacketing ratio is shown by a solid line in FIG. 8.

In the case of traverse velocity of 703 mm/min in this example, the traverse velocity adopted until 1200 turns was 803 mm/min, which was faster than in the case of Example 5, and accordingly the jacketing ratio was smaller by the corresponding degree. On the other hand, in the case of traverse velocity of 983 mm/min, the jacketing ratio was larger by a degree corresponding to the extent in which the traverse velocity adopted until 1200 turns was 803 mm/min, which was slower than in the case of Example 5. It can be seen that the controllability of the jacketing ratio is better in this case as compared with the case of Example 5 because the inclination of the approximate straight line in the case of Example 6 is gentler than in the case of Example 5.

EXAMPLE 7

The deposition of glass particles was performed under the same conditions as described in Example 5 except that the flow rate of H$_2$ supplied to the burners was adjusted so that the temporal variation rate of the surface temperature of the soot glass deposit bodies might become substantially constant in spite of the changes in the traverse velocities. As a result, the bulk densities of the soot glass deposit bodies were in the range of 0.6 to 0.65 g/cm$^3$. The dispersion of the bulk densities was smaller than in the case of the soot glass deposit bodies obtained in Example 5. It is advisable that the deposit bodies manufactured by this method be used in a case such as a dopant being added in the process of consolidating them because such deposit bodies are effective for achieving a uniform addition of the dopant.

What is claimed is:

1. A method of manufacturing an optical fiber preform, comprising the steps of:

obtaining a relationship between three variables: a first variable being the outer diameter of a starting rod, a second variable being the outer diameter of an optical fiber preform, and a third variable being a timing for ending glass particles deposition process, wherein said timing can be changed accurately and continuously;

depositing glass particles on the starting rod by subjecting the starting rod and burners to relative reciprocating movement based on said relationship until the timing for ending the depositing process; and vitrifying a resulting deposit body, wherein said relationship is obtained by the least square method.

2. A method of manufacturing an optical fiber preform according to claim 1, wherein the starting rod is drawn to have an outer diameter determined by an intended outer diameter of an optical fiber preform and jacketing ratio thereof.

3. A method of manufacturing an optical fiber preform according to claim 1, wherein the outer diameter of an optical fiber preform is determined by the outer diameter of the starting rod and a targeted-jacketing ratio.

4. A method of manufacturing an optical fiber preform according to claim 1, wherein said timing is a combination of a number of times of the reciprocating movement and a traverse velocity of the reciprocating movement.

5. A method of manufacturing an optical fiber preform according to claim 4, further comprising the step of drawing a starting rod to have a diameter determined by an intended outer diameter of an optical fiber preform and jacketing ratio.

6. A method of manufacturing an optical fiber preform according to claim 4, wherein a flow rate of a combustible gas supplied to a burner is adjusted at a time of changing the traverse velocity such that the temporal variation in the surface temperature of a soot glass deposit body may become substantially constant in spite of a change in the traverse velocity.

7. A method of manufacturing an optical fiber preform according to claim 5, wherein a flow rate of a combustible gas supplied to a burner is adjusted at a time of changing the traverse velocity such that the temporal variation in the surface temperature of a soot glass deposit body may become substantially constant in spite of a change in the traverse velocity.

8. A method of manufacturing an optical fiber preform according to claim 4, wherein a turning position of the reciprocation movement is shifted by a given distance in a constant direction at each reciprocation movement until a given point, and thereafter the turning position of each movement is shifted by a given distance in the opposite direction at each reciprocation movement to the beginning position.

9. A method of manufacturing an optical fiber preform according to claim 5, wherein a turning position of the reciprocation movement is shifted by a given distance in a constant direction at each reciprocation movement until a given point, and thereafter the turning position of each movement is shifted by a given distance in the opposite direction at each reciprocation movement to the beginning position.

10. A method of manufacturing an optical fiber preform according to claim 6, wherein a turning position of the reciprocation movement is shifted by a given distance in a constant direction at each reciprocation movement until a given point, and thereafter the turning position of each movement is shifted by a given distance in the opposite direction at each reciprocation movement to the beginning position.

11. A method of manufacturing an optical fiber preform according to claim 7, wherein a turning position of the reciprocation movement is shifted by a given distance in a constant direction at each reciprocation movement until a given point, and thereafter the turning position of each movement is shifted by a given distance in the opposite direction at each reciprocation movement to the beginning position.

12. A method of manufacturing an optical fiber preform according to claim 4, wherein said traverse velocity is constant from the beginning to the end of the deposition of glass particles.

13. A method of manufacturing an optical fiber preform according to claim 4, wherein the velocity of rod traverse or burner traverse for depositing glass particles is constant for a given number of times of the reciprocating movement, and thereafter the traverse velocity is set to a speed that can achieve a target jacketing ratio.

14. A method of manufacturing an optical fiber preform according to claim 5, wherein said traverse velocity is constant from the beginning to the end of the deposition of glass particles.

15. A method of manufacturing an optical fiber preform according to claim 6, wherein said traverse velocity is constant from the beginning to the end of the deposition of glass particles.

16. A method of manufacturing an optical fiber preform according to claim 7, wherein said traverse velocity is constant from the beginning to the end of the deposition of glass particles.

17. A method of manufacturing an optical fiber preform according to claim 8, wherein said traverse velocity is constant from the beginning to the end of the deposition of glass particles.

18. A method of manufacturing an optical fiber preform according to claim 9, wherein said traverse velocity is constant from the beginning to the end of the deposition of glass particles.

19. A method of manufacturing an optical fiber preform according to claim 10, wherein said traverse velocity is constant from the beginning to the end of the deposition of glass particles.

20. A method of manufacturing an optical fiber preform according to claim 11, wherein said traverse velocity is constant from the beginning to the end of the deposition of glass particles.

21. A method of manufacturing an optical fiber preform according to claim 5, wherein the velocity of rod traverse or burner traverse for depositing glass particles is constant for a given number of times of the reciprocating movement, and thereafter the traverse velocity is set to a speed that can achieve a target jacketing ratio.

22. A method of manufacturing an optical fiber preform according to claim 6, wherein the velocity of rod traverse or burner traverse for depositing glass particles is constant for a given number of times of the reciprocating movement, and thereafter the traverse velocity is set to a speed that can achieve a target jacketing ratio.

23. A method of manufacturing an optical fiber preform according to claim 7, wherein the velocity of rod traverse or burner traverse for depositing glass particles is constant for a given number of times of the reciprocating movement, and thereafter the traverse velocity is set to a speed that can achieve a target jacketing ratio.

24. A method of manufacturing an optical fiber preform according to claim 8, wherein the velocity of rod traverse or burner traverse for depositing glass particles is constant for a given number of times of the reciprocating movement, and thereafter the traverse velocity is set to a speed that can achieve a target jacketing ratio.

25. A method of manufacturing an optical fiber preform according to claim 9, wherein the velocity of rod traverse or burner traverse for depositing glass particles is constant for a given number of times of the reciprocating movement, and thereafter the traverse velocity is set to a speed that can achieve a target jacketing ratio.

26. A method of manufacturing an optical fiber preform according to claim 10, wherein the velocity of rod traverse or burner traverse for depositing glass particles is constant for a given number of times of the reciprocating movement, and thereafter the traverse velocity is set to a speed that can achieve a target jacketing ratio.

27. A method of manufacturing an optical fiber preform according to claim 11, wherein the velocity of rod traverse or burner traverse for depositing glass particles is constant for a given number of times of the reciprocating movement, and thereafter the traverse velocity is set to a speed that can achieve a target jacketing ratio.

28. A method of manufacturing an optical fiber preform according to claim 1,
   wherein said timing is a traverse velocity, glass particles deposition time, or weight of a soot glass deposit body.

29. A method of manufacturing an optical fiber preform according to any of claims 1, 4, and 5,
   wherein said burners are arranged in a row at constant intervals, and the row of burners and a starting rod are opposed to each other.

30. A method of manufacturing an optical fiber preform according to claim 4, further comprising the step of:
   determining the outer diameter of an optical fiber preform by the outer diameter of the starting rod and a target-jacketing ratio.

* * * * *